United States Patent Office 2,804,315
Patented Aug. 27, 1957

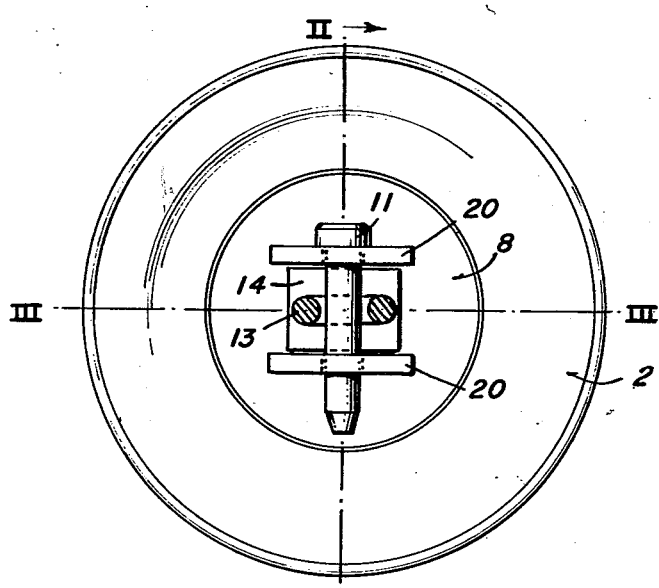
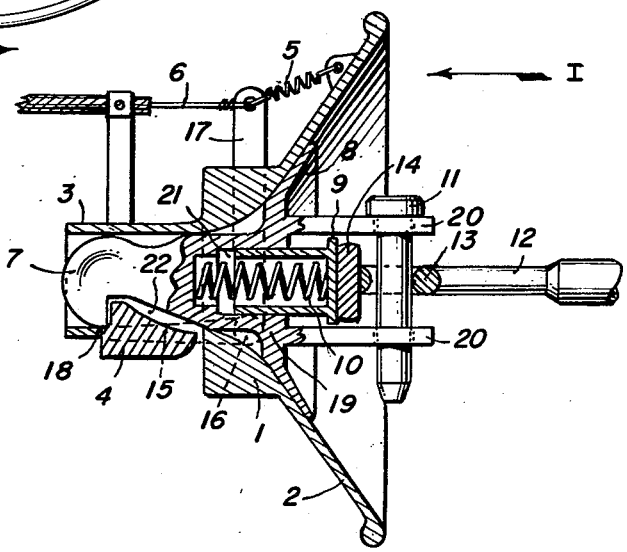
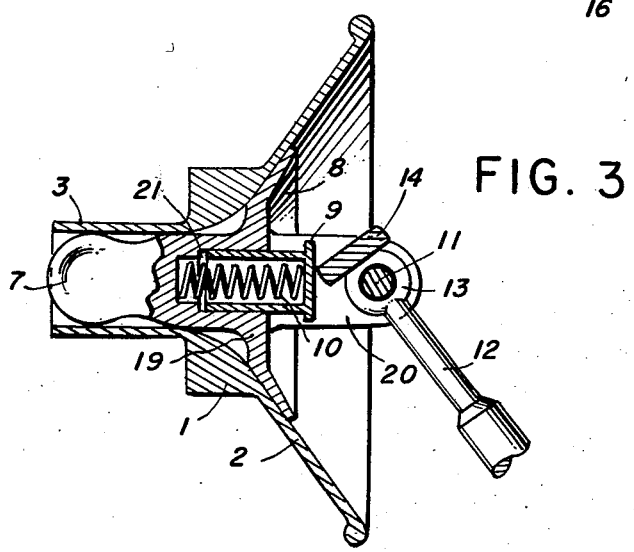

2,804,315

AUTOMATIC TRAILER COUPLING MECHANISM

Pierre Guye, Neu-Allschwil, near Basel, Switzerland, assignor, by mesne assignments, to Saul & Co., Newark, N. J., as nominee of Fidelity Union Trust Company Application November 18, 1954, Serial No. 469,701

Claims priority, application Switzerland April 9, 1954

5 Claims. (Cl. 280—477)

This invention relates to an automatic trailer coupling mechanism, more particularly adapted for application to vehicles adapted both to tow and also to load and unload trailer trains, which vehicles can be used with particular advantage to move material inside factories or the like. The fact that narrow thoroughfares are sometimes encountered, and that a change-over may have to be effected between two different operations, makes it necessary for the vehicle on the one hand to be extremely maneuverable and, on the other hand, to have a coupling mechanism adapted for quick-action automatic coupling and release movements between the towing vehicle and the first trailer of the train.

Conventional coupling mechanisms comprise gripping means so secured to the rear wall of the towing vehicle as to be adapted to move freely, and a drawbar head rigidly secured to the trailer drawbar. The projection of the gripping means is a disadvantage when the towing vehicle is travelling light because the maneuverability thereof is impaired. Efforts have already been made to obviate this disadvantage by fitting rigid gripping means to the towing vehicle and by displacing the pivotal connection of the coupling into the drawbar head, but the coupling mechanism formed in this way has a locking mechanism which is too complicated for the aforesaid requirement as to quick-action coupling and release, nor is it automatic.

The present invention has for its primary object the embodiment of a novel relationship of parts in an automatic trailer coupling mechanism which is free of the prior art defects and disadvantages. This object is realized by the invention, according to which an automatic coupling device particularly adapted for coupling a towing vehicle to a trailer vehicle, comprises a coupling element formed as a conical funnel with a mouthpiece and a tubular throat, said coupling element being adapted to be mounted on a towing vehicle with the mouthpiece directed rearwardly of the vehicle and the throat directed forwardly of the vehicle, a drawbar head comprising a conical portion adapted to be disposed in facial abutment with the conical mouthpiece of the coupling element and a tenon adapted to enter the tubular throat of the coupling element, and means for pivotally connecting said drawbar head to a trailer vehicle, the drawbar head also comprising resilient means adapted to operate upon said pivotal connection whereby to urge said drawbar head into axial alignment with the trailer vehicle, and a spring-urged pawl being mounted on said coupling element and being adapted to engage said tenon to retain said coupling element in coupled engagement with said drawbar head.

A presently preferred embodiment of the novel relationship of parts according to the present invention is illustrated, by way of example, on the accompanying sheet of drawing, and is described in detail in the description which follows.

On the said sheet of drawing:

Fig. 1 is an end elevation looking in the direction of arrow I, Fig. 2,

Fig. 2 is a longitudinal sectional elevation, taken on line II—II of Fig. 1, and Fig. 3 is a sectional plan view taken on line III—III of Fig. 1, but showing parts out of alignment with each other.

A coupling element 1 is mounted rigidly in any suitable and per se conventional manner on the rear of a towing vehicle (not shown), and has a tubular portion 3 which projects forwardly of the vehicle, and a flared or funnel-shaped mouthpiece 2 which is directed rearwardly of the vehicle, the common axis of the said tubular portion 3 and of the mouthpiece 2 being horizontal. A pawl 4 is mounted on one arm 15 of a bell-crank lever which is pivotally mounted at 16 in the element 1, the other arm 17 of the bell-crank lever being connected by a helical tension spring 5 to the mouthpiece 2, and by a Bowden cable 6 or like tension device to an operating lever or the like (not shown) on the towing vehicle. The pawl 4 normally projects, through a slot 18 in the wall of the tube 3, into the interior of said tube, the tension spring 5 operating to retain the pawl in the said normal position. When the cable 6 is pulled by the said operating lever, the lever 15—17 is operated, against the action of the spring 5, to withdraw the pawl 4 from the tube 3.

A drawbar head 19 comprises a cone 8, having an external conical surface adapted to abut closely against the internal conical surface of the mouthpiece 2, and a projecting arm 7, hereinafter referred to as a tenon, which projects from the apex of the cone 8 and has its axis aligned with the axis of the said cone, the said tenon being adapted to repose closely within the tubular portion 3 of the coupling element 1 when the cone 8 reposes closely within the mouthpiece 2, as shown in Fig. 2. The drawbar head 19 also comprises jaws 20 which project from the interior of the cone 8 and between which is disposed an eye 13 on the forward end of a drawbar connecting member 12, a pivot pin 11 being passed vertically through said jaws 20 and the eye 13 to connect said connecting member 12 to the drawbar head 19.

A hollow plunger 9 is disposed slidably within a cylinder 21 formed in the drawbar head 19, the said cylinder and plunger being aligned axially with the tenon 7. A helical compression spring 10 disposed within the cylinder 21 and the plunger 9 operates normally to move the plunger outwardly of cylinder 21. A pressure plate 14 is mounted rigidly on the eye 13 and abuts the head of the plunger 9, the said pressure plate and the said plunger head being disposed between the two jaws 20.

The drawbar head 19 normally is mounted on the front end of a trailer vehicle, being so suspended by a spring, counterweight or other means (not shown) from said vehicle that the axis of said drawbar head is horizontal and is elevated above the ground level, on which the towing and trailer vehicles are to run, the same distance as the axis of the coupling element 1. The connecting member 12 is adapted for connection to the drawbar of a trailer vehicle. Interchangeable connecting members 12 may be provided, the different members 12 being adapted to be secured to different trailer drawbars so that a single drawbar head 19 may be attached to any one of a number of different trailer vehicles.

In order to couple a trailer vehicle to the towing vehicle, the towing vehicle is backed on to the trailer so that the tenon 7 enters the mouthpiece 2. The forward end of the tenon, which preferably is rounded or bulbous as shown, slides along the inner conical face of the mouthpiece 2 until it enters the tube 3. The tenon then penetrates into the tube 3 until the external surface of the cone 8 abuts the internal surface of the mouthpiece 2, at which position the pawl 4 engages a toothed recess 22 in the tenon 7, the pawl being retained in said recess by the spring 5.

When the towing vehicle is being backed on to the trailer, for coupling the vehicles to each other, the axis of the trailer and of the drawbar head can be disposed at any angle, in plan, to the axis of the towing vehicle and of the coupling element 1 within the limits imposed by the requirement that the forward end of the tenon 7 may enter the mouthpiece 2 and may slide down the conical inner surface of said mouthpiece into the tube 3. When the tenon enters the tube 3 the drawbar head 19 will move angularly, about the pivot pin 11, relatively to the drawbar connecting rod 12, until the axis of said drawbar head is aligned with the axis of the coupling element 1. During such angular movement of the drawbar head, the spring 10 will be compressed by the action of the pressure plate 14 against the end of the plunger 9, as shown in Fig. 3, but the axes of the drawbar head 19 and of the connection rod 12 will straighten out into alignment with each other when the towing vehicle hauls the trailer.

If the angle made by the axis of the trailer with the axis of the towing vehicle when the towing vehicle is backed on to the trailer is so acute that the tenon 7 on the drawbar head 19 cannot properly enter the mouthpiece 2 and tube 3, the drawbar head 19 can be moved by hand angularly about the pivot 11, and against the action of the spring 10, until the tenon 7 can conveniently enter said mouthpiece and tube.

When the drawbar head 19 is free from the coupling element 1, it will return, under the action of the spring 10, into axial alignment with the connecting rod 12. This ensures that if the towing vehicle and the trailer are disconnected from each other when they are disposed out of axial alignment with each other, the drawbar head 19 will return to its normal position projected forwardly of the trailer and in axial alignment therewith.

The dimensions of the coupling element 1, and of the drawbar head 19 are such that the axis of the pivot pin 11 is disposed rearwardly of the plane of the outer rim or edge of the mouthpiece 2, that is, the said axis is outside of said mouthpiece. Thereby, the towing vehicle may, when connected to a trailer, make an angle of almost 180 degrees to said trailer when turning an acute corner in narrow passageways, the turning angle being limited only by the connecting rod 12 abutting the edge of the mouthpiece 2.

Disconnection of the drawbar head 19 from the coupling element 1, and thereby disconnection of the towing vehicle from the trailer, is effected by pulling the cable 6, by means of a suitable lever adjacent the driver, thereby operating the lever 15—17, against the spring 5, to release the pawl 4 from the toothed recess 22 in the tenon 7.

If a trailer on to which it is desired to mount the drawbar head 19 is so constructed that the connecting rod 12 cannot conveniently be connected to the drawbar of the trailer, the conventional ring on the trailer drawbar may be connected to the drawbar head by disposing it between the jaws 20, in place of the connecting rod 12 and pressure plate 14, and passing the pivot pin 11 through said ring. To facilitate doing this, the drawbar head 19 may be retained in coupled connection with the coupling element 1.

The axis of the pivot 16 of the bell-crank lever 15—17 is so disposed on the coupling element 1 that tension of the towing vehicle, when towing a trailer, applied through the coupling element 1 and the drawbar head 19, operates to retain the pawl 4 in engagement with the tenon 7, increasing tension tending to increase the closure force of the pawl 4 in the recess 22.

What is claimed is:

1. An automatic coupling device, particularly adapted for coupling a towing vehicle to a trailer vehicle having a drawbar, comprising a coupling element adapted to be mounted on a towing vehicle, and a drawbar head, said drawbar pivotally connected to said drawbar head, the said coupling element comprising a funnel with a conical mouthpiece and a tubular throat, the said mouthpiece, in mounted position of said coupling element, being directed rearwardly of the towing vehicle and the throat being directed forwardly of the said vehicle, and a spring-urged pawl mounted to normally project into said throat, the said drawbar head comprising a conical portion adapted to repose in facial abutment with the conical mouthpiece of the coupling element, a tenon adapted to enter the tubular throat of said coupling element and to be engaged by said spring-urged pawl, said tenon projecting forward of the apex of said conical portion a distance such that when said drawbar head is inserted into said conical mouthpiece said tenon and conical portion both bear on the conical mouthpiece to guide said tenon into said throat, and resilient means in said drawbar head adapted to operate upon said drawbar at the pivotal connection whereby to urge said drawbar head into axial alignment with the trailer vehicle, said pivotal connection of said drawbar head to said drawbar being outside of the mouth of said conical mouthpiece.

2. An automatic coupling device according to claim 1, wherein a pivot pin is provided on said drawbar head for pivotally connecting said drawbar head to said drawbar, said drawbar having an eye thereon for pivotal cooperation with said pivot pin, and a pressure plate rigidly secured to said eye and adapted to engage said resilient means in the drawbar head whereby to compress said resilient means when the said drawbar is moved angularly about said pivot pin out of axial alignment with said drawbar head.

3. An automatic coupling device, according to claim 2, wherein said resilient means in the drawbar head comprises a plunger mounted in a cylinder in the drawbar head for slidable movement therein, and a compression spring adapted to urge said plunger outwardly of said cylinder, said plunger being adapted to engage said pressure plate.

4. An automatic coupling device, according to claim 1, wherein the said pawl is pivotally mounted in the coupling element and the axis of the pivot thereof is so positioned that the force tending to retain said pawl in engagement with the tenon on the drawbar head increases with increased tension between the coupling element and the drawbar head.

5. An automatic coupling device, according to claim 4, wherein said pawl is connected to operating means on the trailer vehicle whereby said pawl may be moved when desired for disconnecting it from said tenon.

References Cited in the file of this patent

UNITED STATES PATENTS

| | | |
|---|---|---|
| 1,610,902 | Tomlinson | Dec. 14, 1926 |
| 2,062,788 | Jacob | Dec. 1, 1936 |
| 2,150,010 | Solomon | May 7, 1939 |
| 2,552,885 | Claud-Mantle | May 15, 1951 |